(12) United States Patent
Kim et al.

(10) Patent No.: US 10,288,795 B2
(45) Date of Patent: May 14, 2019

(54) BACKLIGHT UNIT INCLUDING REFLECTION MEMBER AND DISPLAY DEVICE INCLUDING THE SAME

(71) Applicant: SAMSUNG DISPLAY CO., LTD., Yongin-si, Gyeonggi-do (KR)

(72) Inventors: Raeyoung Kim, Hwaseong-si (KR); Taeksun Shin, Yongin-si (KR); Sangwoo Ha, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/669,081

(22) Filed: Aug. 4, 2017

(65) Prior Publication Data

US 2018/0039010 A1 Feb. 8, 2018

(30) Foreign Application Priority Data

Aug. 4, 2016 (KR) .......................... 10-2016-0099426

(51) Int. Cl.
*F21V 8/00* (2006.01)
(52) U.S. Cl.
CPC .......... *G02B 6/0055* (2013.01); *G02B 6/0038* (2013.01)
(58) Field of Classification Search
CPC .... G02B 6/0031; G02B 6/125; G02B 6/0073; G02B 6/0051; G02B 6/0036; G02B 6/0038; G02F 1/133621; G02F 1/133615
See application file for complete search history.

(56) References Cited

U.S. PATENT DOCUMENTS

| 4,779,166 A * | 10/1988 | Tanaka ................. G02B 6/0021 362/307 |
| 7,192,174 B2 * | 3/2007 | Myoung .................. B24C 1/06 362/561 |
| 8,243,231 B2 | 8/2012 | Hur et al. |
| 9,091,798 B2 | 7/2015 | Yoon et al. |
| 9,507,177 B2 | 11/2016 | Lee et al. |
| 9,671,546 B2 * | 6/2017 | Baek .................... G02B 6/0031 |
| 2003/0137821 A1 * | 7/2003 | Gotoh ................. G02B 6/0016 362/612 |
| 2006/0050282 A1 * | 3/2006 | de Lamberterie ...... F21S 43/14 356/452 |

(Continued)

FOREIGN PATENT DOCUMENTS

| CN | 201047514 | * | 4/2008 |
| KR | 1020070084651 A | | 8/2007 |

(Continued)

*Primary Examiner* — Anh T Mai
*Assistant Examiner* — Fatima N Farokhrooz
(74) *Attorney, Agent, or Firm* — Cantor Colburn LLP

(57) ABSTRACT

A backlight unit includes: a light source which generates light; a light guide plate which receives the light from the light source and guides the light to a display panel which displays an image with the light, the light guide plate including a light incident side surface to which the light from the light source is incident, and an opposing side surface which opposes said light incident side surface; and a reflection member disposed facing the opposing side surface of the light guide plate. Along a length of the opposing side surface of the light guide plate, the reflection member facing the opposing side surface includes at least two reflective portions having different reflectances from each other.

14 Claims, 8 Drawing Sheets

(56) References Cited

U.S. PATENT DOCUMENTS

| | | | | |
|---|---|---|---|---|
| 2006/0146573 A1* | 7/2006 | Iwauchi | ............... | G02B 6/0018 |
| | | | | 362/621 |
| 2007/0103910 A1* | 5/2007 | Brickey | ............... | G02B 5/0242 |
| | | | | 362/311.04 |
| 2009/0067195 A1* | 3/2009 | Yoon | .................... | G02B 6/0031 |
| | | | | 362/623 |
| 2012/0063171 A1* | 3/2012 | Lee | ...................... | G02B 6/0025 |
| | | | | 362/622 |
| 2012/0250349 A1* | 10/2012 | Chang | ................. | G02B 6/0053 |
| | | | | 362/602 |
| 2014/0118661 A1* | 5/2014 | Qi | .................... | G02F 1/133605 |
| | | | | 349/62 |
| 2014/0211125 A1* | 7/2014 | Kurata | ................... | G02B 6/002 |
| | | | | 349/65 |
| 2014/0240828 A1* | 8/2014 | Robinson | ............... | G02B 27/26 |
| | | | | 359/465 |

FOREIGN PATENT DOCUMENTS

| | | | |
|---|---|---|---|
| KR | 1020110022775 A | 3/2011 | |
| KR | 1020130002781 A | 1/2013 | |
| KR | 1020150031675 A | 3/2015 | |
| KR | 1020150092797 A | 8/2015 | |
| KR | 101600996 B1 | 3/2016 | |
| KR | 1020160027447 A | 3/2016 | |

\* cited by examiner

BACKLIGHT UNIT INCLUDING REFLECTION MEMBER AND DISPLAY DEVICE INCLUDING THE SAME

This application claims priority to Korean Patent Application No. 10-2016-0099426, filed on Aug. 4, 2016, and all the benefits accruing therefrom under 35 U.S.C. § 119, the content of which in its entirety is herein incorporated by reference.

BACKGROUND

1. Field

Embodiments of the invention relate to a backlight unit and a display device including the backlight unit, and more particularly, to a backlight unit having improved display quality and a display device including the backlight unit.

2. Description of the Related Art

Liquid crystal display ("LCD") devices, which are one of the most widely used flat panel display ("FPD") devices, include two display substrates on which electrodes are formed and a liquid crystal layer interposed therebetween. The LCD device is a display device that may adjust an amount of transmitted light by applying voltage to two electrodes to rearrange liquid crystal molecules of the liquid crystal layer.

An LCD device, which is a passive light emitting device, includes a display substrate which generates and displays an image and a backlight unit ("BLU") for providing light to the display substrate. Backlight units are classified into a direct type backlight unit, an edge type backlight unit and a corner type backlight unit according to the position of a light source within a display device.

Among the types of the backlight unit, the edge type backlight unit may include a light source which generates light and a light guide plate that receives the light from the light source at one surface thereof and supplies the light to a display panel of a display device.

In the edge type backlight unit, since the light source is disposed at one side surface of a light guide plate, it is important that the light from the light source is uniformly distributed on and from the light guide plate.

SUMMARY

Embodiments of the invention may be directed to a backlight unit which uniformly distributes light by a light guide plate therein, and a display device including the backlight unit.

According to an exemplary embodiment, a backlight unit includes: a light source which generates light; a light guide plate which receives the light from the light source and guides the light to a display panel which displays an image with the light, the light guide plate including a light incident side surface to which the light from the light source is incident, and an opposing side surface which opposes said light incident side surface; and a reflection member disposed facing the opposing side surface of the light guide plate. Along a length of the opposing side surface of the light guide plate, the reflection member facing the opposing side surface includes at least two reflective portions having different reflectances from each other.

Along the length of the opposing side surface of the light guide plate, the reflection member may include: a first portion at a central portion of the opposing surface; and a second portion at an end portion of the opposing surface. The first portion may have a less reflectance than a reflectance of the second portion.

Along the length of the opposing side surface of the light guide plate, reflectance of the reflection member may gradually increase from the first portion toward the second portion.

Along the length of the opposing side surface of the light guide plate, a thickness of the reflection member may gradually increase from the first portion toward the second portion.

The opposing side surface of the light guide plate or a light incident surface of the reflection member may include a reflection layer thereon.

The reflection layer may include at least one selected from silver (Ag), aluminum (Al), nickel (Ni), gold (Au), ruthenium (Ru), rhodium (Rh), palladium (Pd), osmium (Os), iridium (Ir), platinum (Pt) and alloys thereof.

Along the length of the opposing side surface of the light guide plate, an area of the opposing side surface of the light guide plate or the light incident surface of the reflection member respectively corresponding to the reflection layer may gradually increase from the first portion toward the second portion.

The backlight unit may further include a reflective adhesive layer between the opposing side surface of the light guide plate and a light incident surface of the reflection member. The reflective adhesive layer may include a transparent adhesive material and a reflective material which is dispersed in the transparent adhesive material.

Along the length of the opposing side surface of the light guide plate, a density of the reflective material may gradually increase from the first portion toward the second portion, The light guide plate may further include an upper surface through which guided light exits the light guide plate toward the display panel, and a lens pattern at the upper surface of the light guide plate.

The lens pattern at the upper surface of the light guide plate may include a dome-shaped lens pattern extending from the light incident side surface to the opposing side surface.

According to another exemplary embodiment, a display device includes: a display panel which displays an image with the light; a light source which generates the light; a light guide plate which receives the light from the light source and guides the light to the display panel, the light guide plate including a light incident side surface to which the light from the light source is incident, and an opposing side surface which opposes said light incident side surface; and a reflection member disposed facing the opposing side surface of the light guide plate. Along a length of the opposing side surface of the light guide plate, the reflection member facing the opposing side surface includes at least two reflective portions having different reflectances from each other.

Along the length of the opposing side surface of the light guide plate, the reflection member may include: a first portion at a central portion of the opposing surface; and a second portion at an end portion of the opposing surface. The first portion may have a less reflectance than a reflectance of the second portion.

Along the length of the opposing side surface of the light guide plate, a reflectance of the reflection member may gradually increase from the first portion toward the second portion.

Along the length of the opposing side surface of the light guide plate, a thickness of the reflection member may gradually increase thickness from the first portion toward the second portion.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Figure 1:
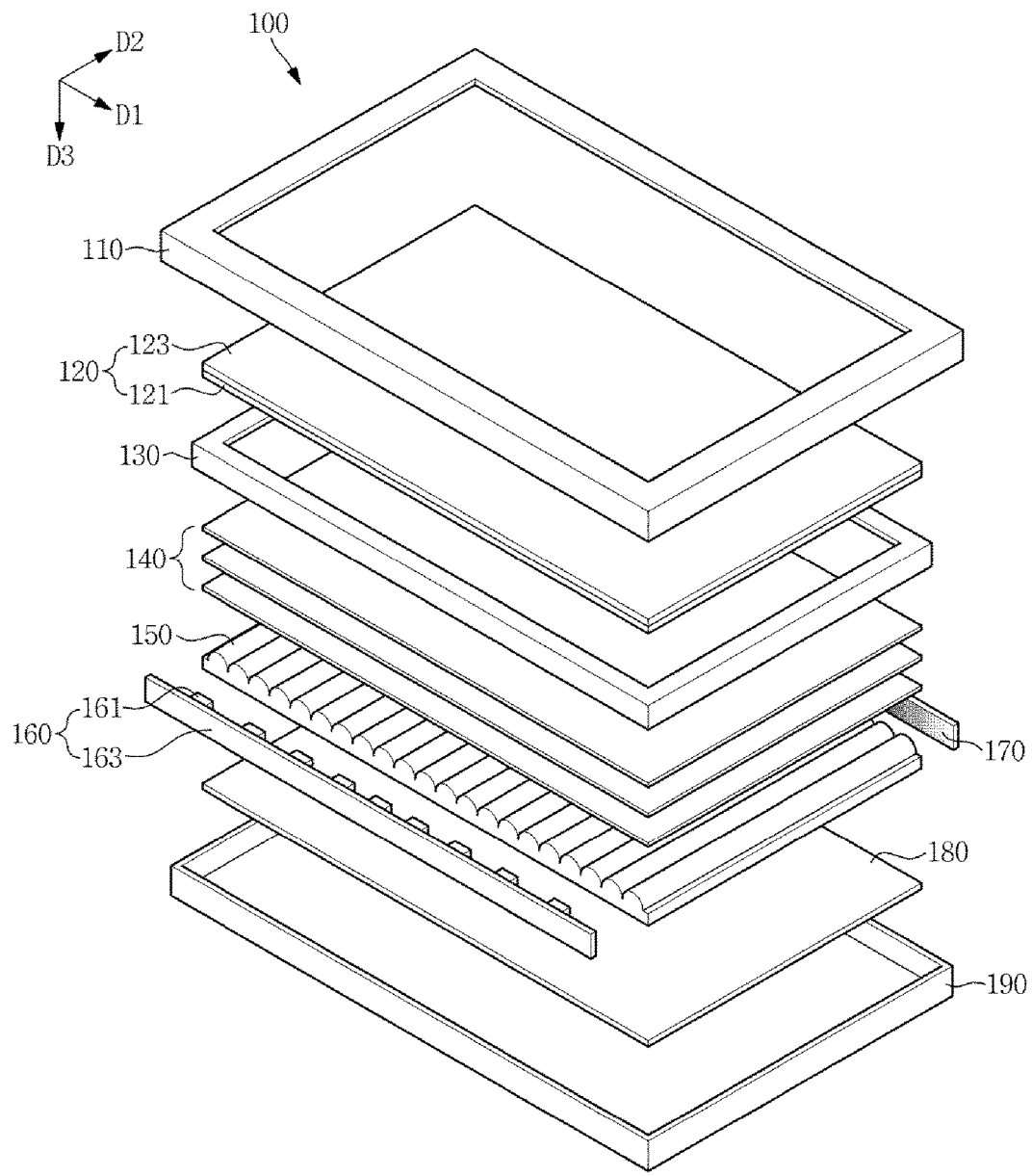
FIG. 1 is an exploded perspective view illustrating an exemplary embodiment of a display device according to the invention.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area or plate is referred to as being related to another layer such as being "on" another layer, area or plate, it may be directly on the other layer, area or plate, or intervening layers, areas or plates may be present therebetween. Conversely, when a layer, area or plate is referred to as being related to another layer such as being "directly on" another layer, area or plate, intervening layers, areas, or plates may be absent therebetween. Further when a layer, area or plate is referred to as being related to another layer such as being "below" another layer, area or plate, it may be directly below the other layer, area or plate, or intervening layers, areas, or plates may be present therebetween. Conversely, when a layer, area or plate is referred to as being related to another layer such as being "directly below" another layer, area or plate, intervening layers, areas or plates may be absent therebetween.

The spatially relative terms "below," "beneath," "less," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being related to another layer such as being "connected" to another element, the element is "physically connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means in an acceptable range of deviation for the particular value as determined by one of ordinary skill in the art, considering the measurement in question and the error associated with measurement of the particular quantity (i.e., the limitations of the measurement system). For example, "about" may mean in one or more standard deviations, or in ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the invention and like reference numerals refer to like elements throughout the specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
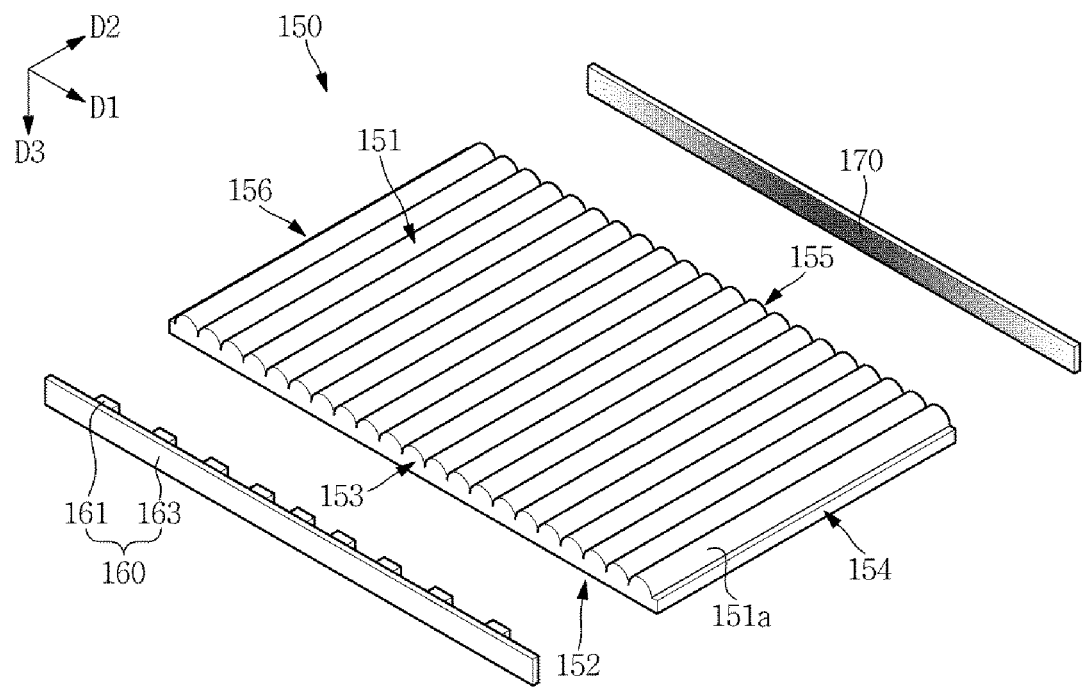
FIG. 2 is an exploded perspective view illustrating an exemplary embodiment of a light source, a light guide plate and a reflection member of a display device, relative to each other, according to the invention.
Figure 3:
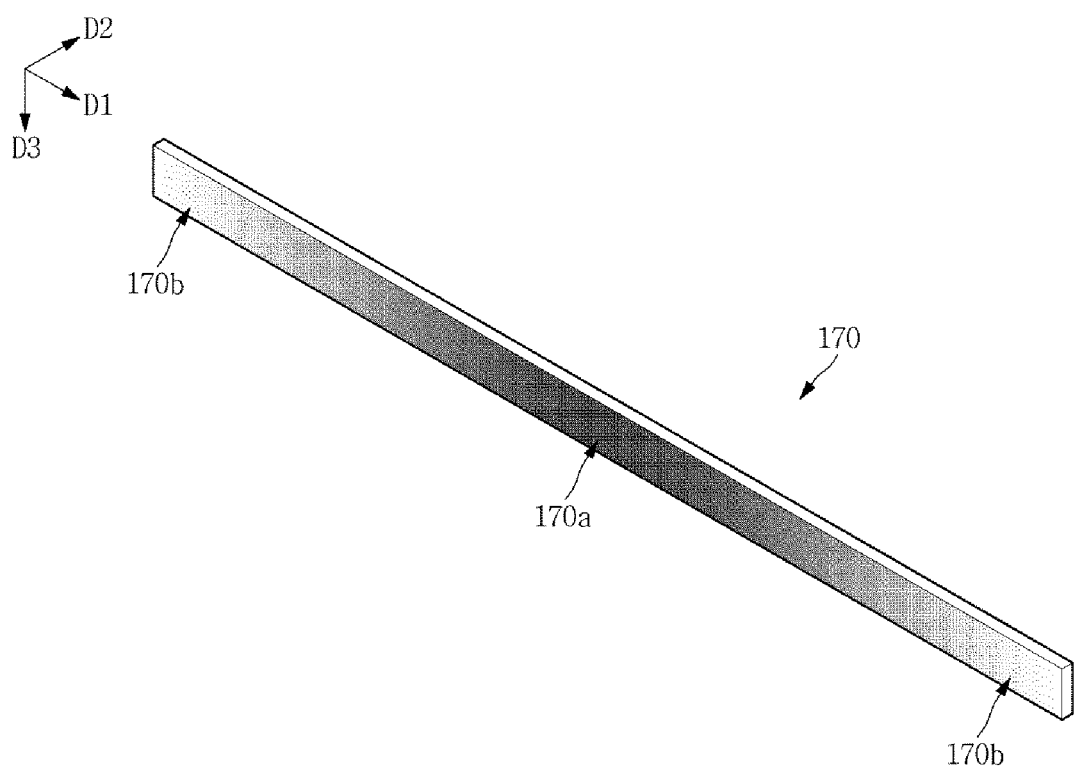
FIG. 3 is a perspective view illustrating an exemplary embodiment of the reflection member in FIG. 2 according to the invention.

FIG. 1 is a perspective view illustrating an exemplary embodiment of a display device according to the invention, FIG. 2 is a perspective view illustrating a light source, a light guide plate and a reflection member of a display device, relative to each other, according to the invention and FIG. 3 is a perspective view illustrating an exemplary embodiment of the reflection member in FIG. 2 according to the invention.

Hereinafter, for convenience of explanation, a relatively long side direction of a display device 100 is defined as a first direction D1, a relatively short side direction of the display device 100 is defined as a second direction D2, and a thickness direction of the display device 100 is defined as a third direction D3.

Referring to FIG. 1, the display device 100 may include an upper frame (or a top chassis) 110, a display panel 120 which generates and displays an image with light, an intermediate frame (or a mold frame) 130, an optical sheet 140, a light guide plate 150, a light source unit 160, a reflection member 170, a reflection sheet 180 and a lower frame (or a bottom chassis) 190.

Hereinafter, the intermediate frame 130, the optical sheet 140, the light guide plate 150, the light source unit 160, the reflection member 170, the reflection sheet 180 and the lower frame 190 will be collectively referred to as a backlight unit.

The upper frame 110 has an opening window for exposing an active (display) area of the display panel 120 to outside the display device 100. The upper frame 110 may be disposed so as to cover an upper edge of the display panel 120 and a side surface thereof.

The upper frame 110 fixes an upper edge of the display panel 120 within the display device 100 to substantially prevent detachment of the display panel 120 from the backlight unit. The upper frame 110 may be fixed to each of the intermediate frame 130 and the lower frame 190. The upper frame 110 may be fixed to the intermediate frame 130 and the lower frame 190 using a hook and/or a screw.

The upper frame 110 may include a relatively rigid metal material such as stainless steel or a material having good heat dissipation characteristics such as aluminum or an aluminum alloy. In an exemplary embodiment of manufacturing the display device, the upper frame 110 may be formed by a press molding process or the like to have a predetermined curvature.

The display panel 120 is a display panel that displays an image using light. The display panel 120 includes, on a plane, a display area at which an image is displayed, and a non-display area surrounding the display area and at which the image is not displayed. The non-display area is covered by the upper frame 110. The display area of the display panel 120 is exposed at the opening window of the upper frame 110, to outside the display device 100.

In FIG. 1, the display panel 120 is depicted as having a quadrangular plate shape, having a pair of relatively long sides and a pair of relatively short sides, but exemplary embodiments are not limited thereto. In an exemplary embodiment, the display panel 120 may have various shapes.

The display panel 120 includes a first (display) substrate 121, a second (display) substrate 123 opposing the first substrate 121 and an optical medium layer such as a liquid crystal layer (not illustrated) between the first substrate 121 and the second substrate 123.

The first substrate 121 includes a pixel electrode provided in plurality arranged in a matrix, a thin film transistor applying a driving voltage to the pixel electrode, and various signal lines for driving the pixel electrode and the thin film transistor.

The second substrate 123 is disposed to oppose the first substrate 121, and includes a common electrode including a transparent conductive material, and a color filter. The color filter may include a red color filter, a green color filter and/or a blue color filter.

The optical medium layer such as the liquid crystal layer (not illustrated) is disposed between the first substrate 121 and the second substrate 123 and orientations of molecules thereof are rearranged by an electric field formed between the pixel electrode and the common electrode. Accordingly, the rearranged molecules of the liquid crystal layer controls transmittance of light emitted from the backlight unit, and the controlled light may pass through the color filter such that an image may be displayed outwards from the display panel.

The intermediate frame 130 has a quadrangular loop shape. The intermediate frame 130 supports the display panel 120 thereon and accommodates the optical sheet 140, the light guide plate 150 and the like therein. The intermediate frame 130 may be formed as a single integral shape, but may be formed by a plurality of pieces separately formed from each other and assembled thereafter, when necessary.

The optical sheet 140 is disposed on the light guide plate 150 and is configured to diffuse and/or collimate the light output from the light guide plate 150. The optical sheet 140 includes a collection of individual sheets such as a diffusion sheet, a prism sheet and/or a protective sheet. The diffusion sheet, the prism sheet and the protective sheet may be sequentially stacked on the light guide plate 150 in the order listed.

The prism sheet collimates the light guided by the light guide plate 150, the diffusion sheet diffuses the light collimated by the prism sheet, and the protective sheet protects the prism sheet and the diffusion sheet. The light that has passed through the protective sheet is provided toward the display panel 120.

The light guide plate 150 uniformly supplies the light provided from the light source unit 160 to the display panel 120. In an exemplary embodiment of manufacturing the display device, the light guide plate 150 may be formed into an initial flat shape and then may have a predetermined curvature by being subsequently coupled to a fixed frame. The light guide plate 150 includes a material that may be deformable such that a flat-shaped light guide plate 150 can be curved so as to have a predetermined curvature.

The light guide plate 150 has been described as a plate, such as having a relatively large cross-sectional thickness, for ease of explanation, the invention is not limited thereto. In an exemplary embodiment, the light guide plate 150 may be formed in the form of a sheet or a film for which the cross-sectional thickness is smaller than that of the plate and is relatively small as compared to the planar size thereof, for slimming down the display device 100. That is, the light guide plate 150 of the display device 100 may have either a plate shape or a film shape for guiding light.

The light guide plate 150 may include a light transmitting material including, for example, an acrylic resin, such as polymethylmethacrylate ("PMMA"), or polycarbonate ("PC") so as to guide light efficiently therein.

Referring to FIGS. 1, 2 and 3, the light guide plate 150 according to the exemplary embodiment may be arranged so as to substantially overlap the display panel 120 in a top plan view. The light guide plate 150 may have a rectangular parallelpiped shape including an upper surface 151 facing the display panel 120, a lower surface 152 opposing the upper surface 151, and first, second, third and fourth side surfaces 153, 154, 155 and 156 each connecting the upper surface 151 and the lower surface 152 to each other.

The light source unit 160 may be disposed located adjacent to at least one of the side surfaces 153, 154, 155, 156 of the light guide plate 150. Hereinafter, for ease of description, the light source unit 160 is disposed adjacent to the first side surface 153 of the light guide plate 150.

The reflection member 170 according to the exemplary embodiment may be disposed location adjacent to the third side surface 155 opposing the first side surface 153 of the light guide plate 150, but exemplary embodiments are not limited thereto. In an exemplary embodiment, the reflection member 170 may be disposed located adjacent to at least one of the side surfaces 154, 155 and 156, except the first side surface 153 of the light guide plate 150 at which the light source unit 160 is disposed.

The first side surface 153 at which the light source unit 160 is disposed may be referred to as a light incident surface of the light guide plate 150 and the third side surface 155 opposing the light incident surface may be referred to as an opposing surface of the light guide plate 150. In the case where the light source unit 160 is disposed adjacent to the second side surface 154, the light incident surface may be the second side surface 154 and the opposing surface may be the fourth side surface 156.

That is, the light guide plate 150 according to the embodiment may receive the light, provided from the light source 160, at the first side surface 153 and emit the light toward and through the upper surface 151.

The light guide plate 150 according to the exemplary embodiment may include at least one lens pattern 151a at the upper surface 151. The lens pattern 151a may define the upper surface 151 through which light is emitted from the light guide plate 150 (e.g., an emission surface). The lens pattern 151a may have a dome shape in cross-section, and the dome shape may define a length thereof extending in one direction (e.g., a second direction D2). The lens pattern 151a may extend an entire length of the light guide plate 150 in the second direction D2, that is, from the light incident surface to which the light is incident from the light source 160 to an opposing (third side) surface 155 opposing the light incident surface.

The lens pattern 151a may be provided in plurality at the upper surface 151 of the light guide plate 150, to be arranged in the first direction D1. The plurality of lens patterns 151a arranged in the first direction D1 may contact each other, but the invention is not limited thereto. The plurality of lens patterns 151a may each extend from a common plate-shaped portion of the light guide plate 150.

The light incident inside the light guide plate 150 may be guided and emitted therefrom to have relatively high straightness (e.g., direction perpendicular to the emission surface of the overall light guide plate 150 and towards the optical sheet 140) due to the lens pattern 151a. That is, the light incident inside the light guide plate 150 may be guided so as to not overlap each other in the light guide plate 150.

The light source unit 160 may include a light source 161 which generates light and a circuit board 163 on which the light source 161 is disposed.

The light source 161 may include at least one light emitting diode ("LED") chip (not illustrated) and a package (not illustrated) for accommodating the LED chip. In an exemplary embodiment, for example, the LED chip (not illustrated) may be a gallium nitride (GaN)-based LED chip generating and emitting a blue light.

The number of the light sources 161 may have various values in consideration of the size of the display panel 120, luminance uniformity, or the like. The circuit board 163 may be a printed circuit board ("PCB") or a metal printed circuit board (metal "PCB").

Although not illustrated, a wavelength converter (not illustrated) may be disposed between the light guide plate 150 and the light source unit 160. The wavelength converter (not illustrated) may include a material for converting the wavelength of light incident thereto. In an exemplary embodiment, for example, the wavelength converter may convert a wavelength of a blue light emitted from a blue LED light source into a white light.

The reflection member 170 reflects the light traveling within the light guide plate 150 to the side surfaces 154, 155 and 156 of the light guide plate 150 at which the light source unit 160 is absent, to proceed again toward the inside of the light guide plate 150, thereby improving luminous efficiency.

The reflection member 170 according to the exemplary embodiment may be disposed at the third side surface (or the opposing surface) 155. A light incident surface of the reflection member 170, to which light is incident from the light guide plate 150, faces the third side surface (or the opposing surface) 155.

The reflection member 170 may include, for example, a white tape or polyethylene terephthalate ("PET"), thus having reflective characteristics. A surface of the reflection member 170 may be coated with a diffusion layer including, for example, titanium dioxide.

The reflection member 170 may include or define a first portion 170a corresponding to a central portion of the third side surface 155, and a second portion 170b corresponding to an end portion of the third side surface 155. The first portion 170a may have a reflectance less than a reflectance of the second portion 170b.

The reflectance of the reflection member 170 may gradually increase from the first portion 170a toward the second portion 170b.

As the reflectance of the reflection member 170 according to the exemplary embodiment increases from the first portion 170a disposed at the central portion of the opposing surface 155 toward the second portion 170b disposed at the end portion of the opposing surface 155, a dark portion generated at the end portion of the light guide plate 150 may be removed and accordingly, the light may be uniformly distributed in the light guide plate 150.

Referring back to FIG. 1, the reflection sheet 180 is disposed between the light guide plate 150 and the lower frame 190. The reflection sheet 180 reflects the light emitted to a lower surface of the light guide plate 150 to proceed again toward the display panel 120, thereby improving luminous efficiency.

The reflection sheet 180 may include, for example, polyethylene terephthalate ("PET"), thus having reflective characteristics. A surface of the reflection sheet 180 may be coated with a diffusion layer including, for example, titanium dioxide. In an exemplary embodiment, the reflection sheet 180 may include a material including a metal such as silver (Ag).

In addition, although not illustrated, a heat dissipation member (not illustrated) may be disposed between the light source unit 160 and the lower frame 190. The heat dissipation member dissipates heat generated in the light source unit 160 to the outside. In the case where the light source unit 160 is arranged in a bar or line shape at one side surface of the lower frame 190, the heat dissipation member may also be arranged as a metal frame having a bar or line shape. As described above, the heat dissipation member may have various shapes according to the shape of the light source unit 160.

The lower frame 190 maintains the overall framework of the display device 100 and protects various components accommodated therein. The lower frame 190 may include a relatively rigid metal material such as stainless steel or a material having good heat dissipation properties such as aluminum or an aluminum alloy. In an exemplary embodiment of manufacturing the display device, the lower frame 190 may be formed by a press molding process or the like to have a predetermined curvature.

Hereinafter, the backlight unit and the display device including the backlight unit according to other exemplary embodiments will be described. The duplicated descriptions of the backlight unit and the display device including the backlight unit according to the exemplary embodiment in FIGS. 1 to 3 will be omitted from the descriptions of the backlight unit and the display device including the backlight unit according to other exemplary embodiments.

Figure 4:
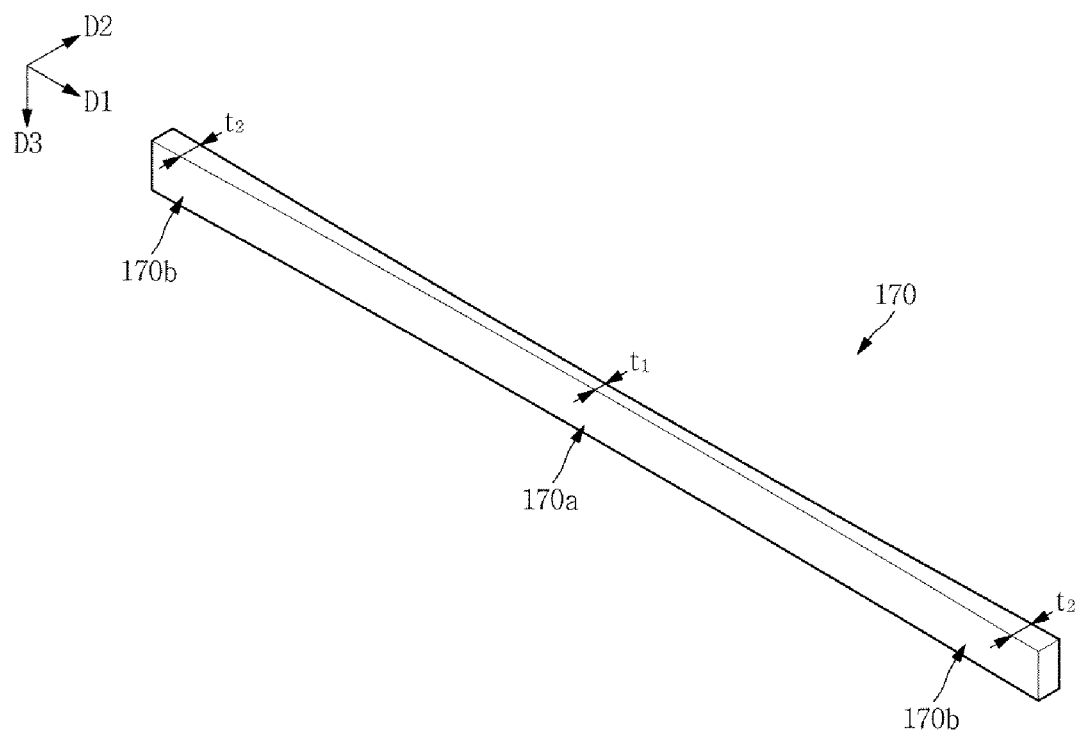
FIG. 4 is a perspective view illustrating another exemplary embodiment of the reflection member in FIG. 2 according to the invention.

FIG. 4 is a perspective view illustrating another exemplary embodiment of a reflection member 170 according to the invention.

Referring to FIG. 4, the reflection member 170 according to may include or define a first portion 170a corresponding to a central portion of an opposing surface 155 of the light guide plate 150, and a second portion 170b corresponding to an end portion of the opposing surface 155 of the light guide plate 150. The first portion 170a may have a reflectance less than a reflectance of the second portion 170b. The reflectance of the reflection member 170 may gradually increase from the first portion 170a toward the second portion 170b.

The reflection member 170 defines a length thereof in the first direction D1 and a width thereof in the third direction D3. In addition, a thickness of the reflection member 170 in the second direction D2 may gradually increase from the first portion 170a toward the second portion 170b. That is, a thickness t1 of the first portion 170a is less than a thickness t2 of the second portion 170b.

The thickness of the reflection member 170 may be the smallest in the first portion 170a and may gradually increase toward the second portion 170b to be largest at the end of the reflection member 170, such as at both of the ends opposing each other in the first direction D1.

As described above, as the thickness of the reflection member 170 according to the exemplary embodiment increases from the first portion 170a disposed at the central portion of the opposing surface 155 toward the second portion 170b disposed at the end portion of the opposing surface 155, a dark portion generated at the end portion of the light guide plate 150 may be removed and accordingly, the light may be uniformly distributed in the light guide plate 150.

Figure 5:
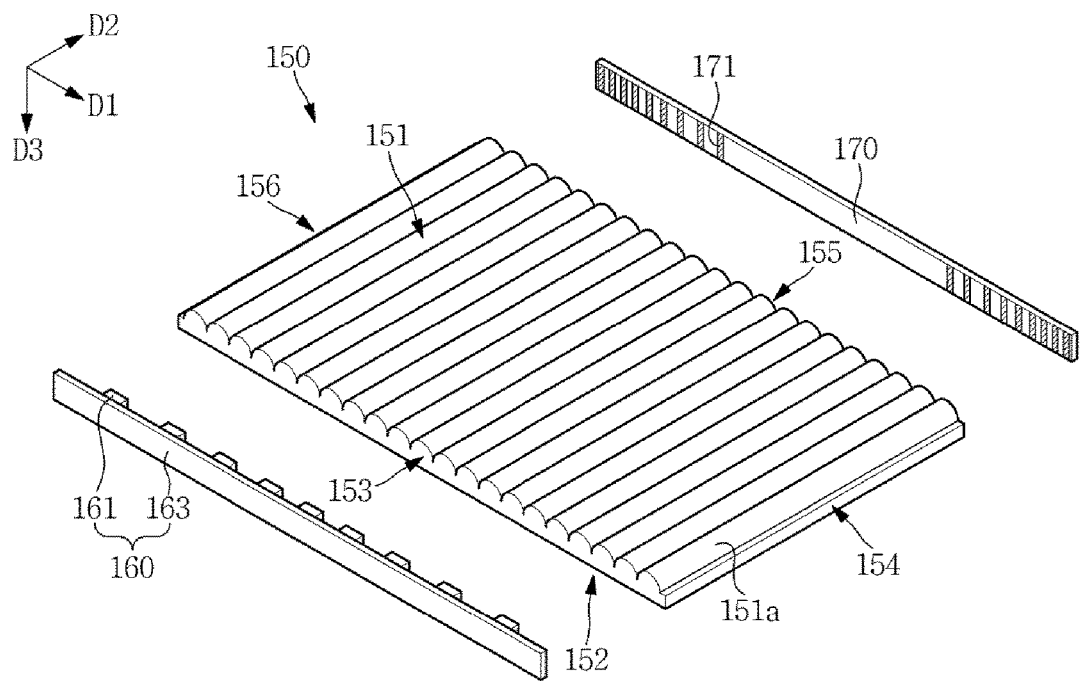
FIG. 5 is a perspective view illustrating another exemplary embodiment of a light source, a light guide plate and a reflection member of a display device, relative to each other, according to the invention.
Figure 6:
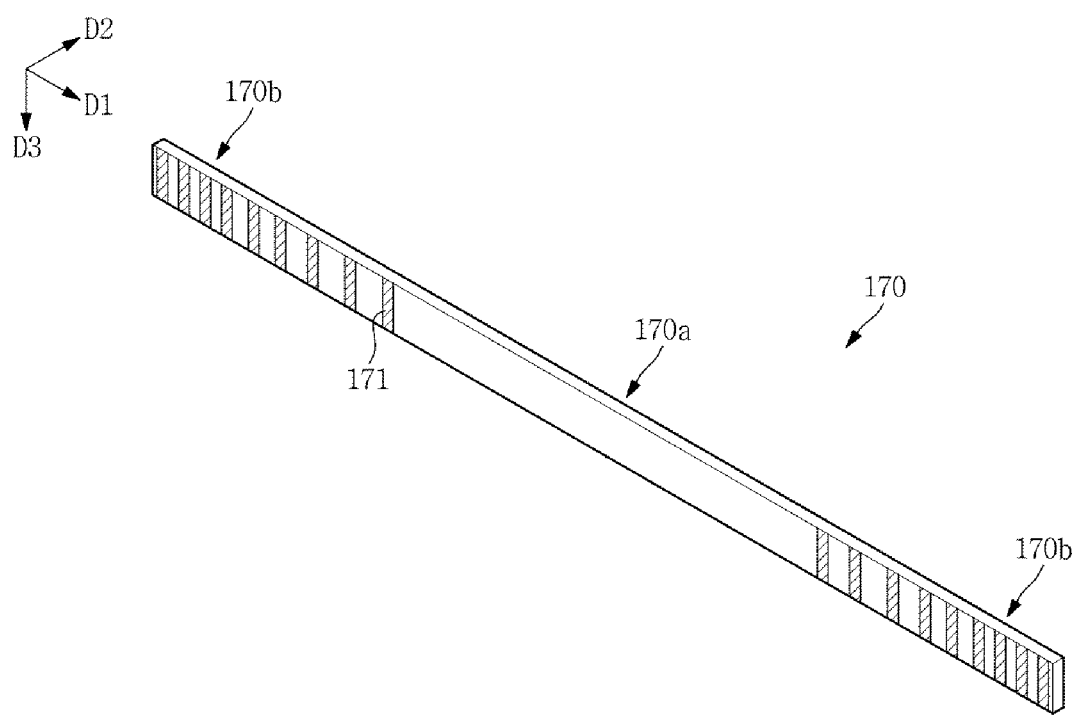
FIG. 6 is a perspective view illustrating an exemplary embodiment of the reflection member in FIG. 5 according to the invention.

FIG. 5 is a perspective view illustrating another exemplary embodiment of a light source, a light guide plate and a reflection member of a display device, relative to each other, according to the invention, and FIG. 6 is a perspective view illustrating an exemplary embodiment of the reflection member in FIG. 5 according to the invention.

Referring to FIGS. 5 and 6, a display device may further include a reflection layer 171 between a light guide plate 150 and a reflection member 170. The reflection layer 171 may be disposed on at least one of the light guide plate 150 and the reflection member 170. That is, with the light guide plate 150 and the reflection member 170 as being provided as separate bodies from each other, the reflection layer 171 may be on the body of the light guide plate 150 or on the body of the reflection member 170 such as on the light incident surface thereof. The reflection layer 171 may be provided in plurality on a surface of the respective one of the reflection member 170 and the light guide plate 150. The reflection layer 171 according to the exemplary embodiment is assumed to be disposed on the reflection member 170.

The reflection member 170 according to the exemplary embodiment may include a first portion 170a corresponding to a central portion of an opposing surface 155 of the light guide plate 150 and a second portion 170b corresponding to an end portion of the opposing surface 155 of the light guide plate 150. A total area of a surface of the reflection member 170 may be defined as a product of the length and the width thereof. The plurality of reflection layers 171 on the (light incident) surface of the body of the reflection member 170 occupies or overlaps a portion of the total area thereof. An area of the body of the reflection member 170 occupied by the reflection layer 171 may gradually increase from the first portion 170a toward the second portion 170b.

The reflection layer 171 may be applied in higher frequency on the reflection member 170 from a portion disposed at the central portion of the opposing surface 155 of the light guide plate 150 toward a portion disposed at the end portion of the light guide plate 150. An application amount of the reflection layer 171 on the reflection member 170 may gradually increase from a portion thereof corresponding to the central portion of the opposing surface 155 of the light guide plate 150 toward a portion thereof corresponding to the end portion of the light guide plate 150.

The reflection layer 171 may be applied on the reflection member 170 as a discrete member in the form of a stripe extending horizontally (along the first direction D1) or vertically (along the third direction D3). Herein, the reflection layer 171 according to the exemplary embodiment will be described on the assumption that the reflection layer 171 has a vertical stripe shape. A distance in the first direction D1 between each of the reflection layers 171 applied in the form of a vertical stripe shape may be gradually reduced from a location corresponding to the central portion of the opposing surface 155 of the light guide plate 150 toward a location corresponding to the end portion of the light guide plate.

The reflection layer 171 according to the exemplary embodiment may include at least one selected from silver (Ag), aluminum (Al), nickel (Ni), gold (Au), ruthenium (Ru), rhodium (Rh), palladium (Pd), osmium (Os), iridium (Ir), platinum (Pt) and alloys thereof.

In the display device according to the exemplary embodiment, as the reflection layer 171 is applied in larger density, frequency or amount in a direction from the central portion of the opposing surface 155 of the light guide plate 150 toward the end portion thereof, the reflectance may increase accordingly.

Accordingly, a dark portion generated at the end portion of the light guide plate 150 may be removed and accordingly, the light may be uniformly distributed in the light guide plate 150.

Figure 7:
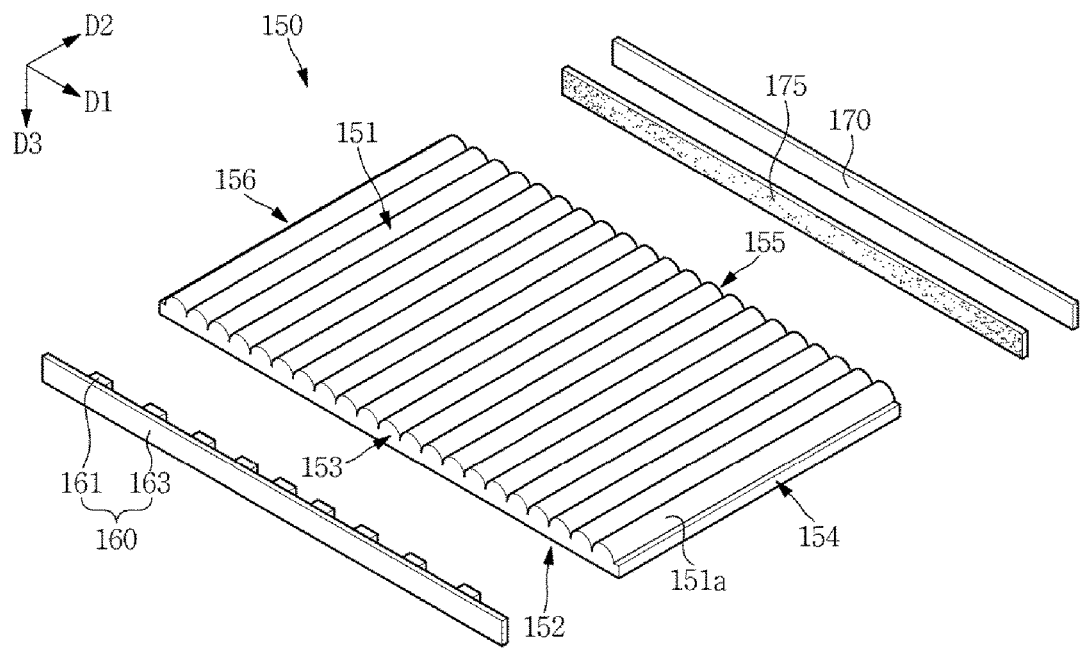
FIG. 7 is a perspective view illustrating an exemplary embodiment of a light source, a light guide plate, an adhesive layer and a reflection member of a display device, relative to each other, according to the invention.
Figure 8:
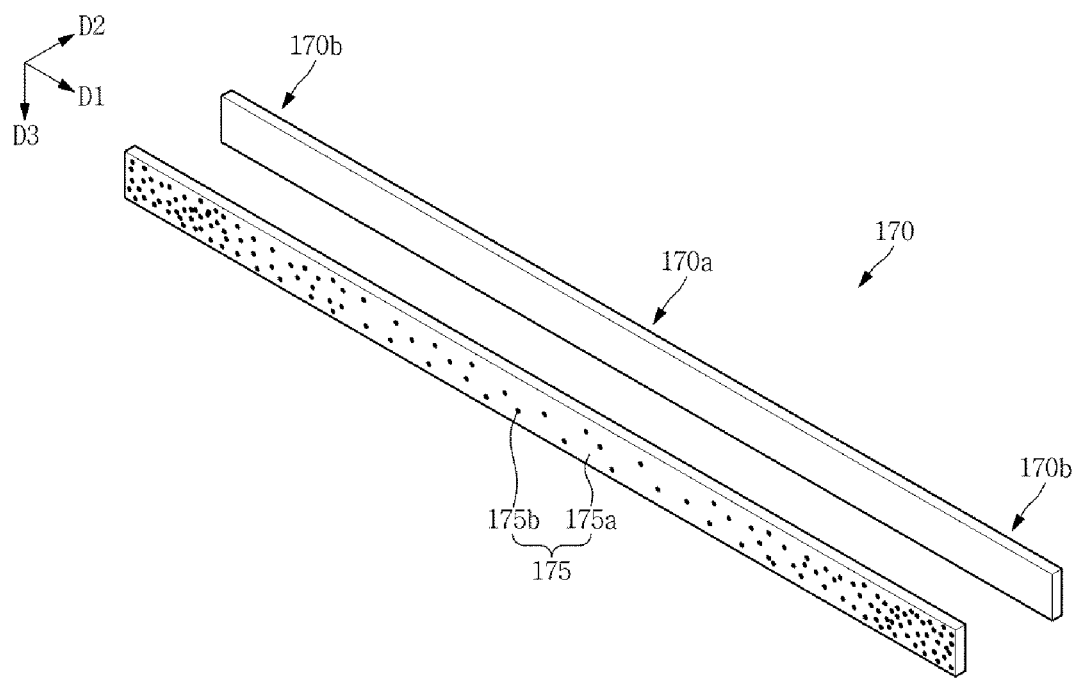
FIG. 8 is a perspective view illustrating an exemplary embodiment of the adhesive layer in FIG. 7 according to the invention.

FIG. 7 is a perspective view illustrating an exemplary embodiment of a light source, a light guide plate, an adhesive layer and a reflection member of a display device, relative to each other, according to the invention, and FIG. 8 is a perspective view illustrating an exemplary embodiment of the adhesive layer in FIG. 7 according to the invention.

Referring to FIGS. 7 and 8, a display device may further include an adhesive layer 175 between a light guide plate 150 and a reflection member 170. Particularly, the adhesive layer 175 is between the opposing surface of the light guide plate 150 and the light incident surface of the reflection member 170. In an exemplary embodiment, the reflective adhesive layer 175 and the reflection member 170 may together define a collective reflective layer.

The reflection member 170 according to the exemplary embodiment may include a first portion 170a corresponding to a central portion of an opposing surface 155 of the light guide plate 150 and a second portion 170b corresponding to an end portion of the opposing surface 155 of the light guide plate.

The adhesive layer 175 may include a transparent adhesive (base) material 175a and a reflective material 175b which is dispersed in the transparent adhesive material 175a. The reflective material 175b may be provided in plurality within the transparent adhesive material 175a. The reflective material 175b may be a discrete particle provided in plurality within the transparent adhesive material 175a.

The reflective material 175b may be disposed in the transparent adhesive material 175a at a density which gradually increases from a location at the first portion 170a toward a location at the second portion 170b of the reflective member 170. That is, the number of particles distributed in a unit area of the transparent adhesive material 175a increases from locations of the adhesive layer 175 at the first portion 170a toward locations of the adhesive layer 175 at the second portion 170b.

The reflective material 175b may include at least one selected from silver (Ag), aluminum (Al), nickel (Ni), gold (Au), ruthenium (Ru), rhodium (Rh), palladium (Pd), osmium (Os), iridium (Ir), platinum (Pt) and alloys thereof.

The display device according to the exemplary embodiment includes the adhesive layer 175 including the reflective material 175b, and the reflective material 175b may increase in density within the adhesive layer 175 from locations of the adhesive layer 175 at the central portion of the opposing surface 155 of the light guide plate 150 toward locations of the adhesive layer 175 at the end portion of the light guide plate 150. Accordingly, a dark portion generated at the end portion of the light guide plate 150 may be removed and accordingly, the light may be uniformly distributed in the light guide plate 150.

As set forth hereinabove, according to one or more exemplary embodiments, the backlight unit and the display device including the backlight unit may uniformly distribute light by the light guide plate disposed therein.

The backlight unit and the display device including the backlight unit may have improved display quality owing to the uniformly distributed light by the light guide plate disposed therein.

While the invention has been illustrated and described with reference to the exemplary embodiments thereof, it will be apparent to those of ordinary skill in the art that various changes in form and detail may be formed thereto without departing from the spirit and scope of the invention.

What is claimed is:

1. A backlight unit comprising:
    a light source which generates light;
    a light guide plate which receives the light from the light source and guides the light to a display panel which displays an image with the light,
    the light guide plate comprising a light incident side surface to which the light from the light source is incident, and an opposing side surface which opposes said light incident side surface; and
    a reflection member disposed facing the opposing side surface of the light guide plate, wherein along a length of the opposing side surface of the light guide plate, the reflection member facing the opposing side surface comprises: a first portion at a central portion of the opposing side surface of the light guide plate; and a second portion at an end portion of the opposing side surface of the light guide plate,
    wherein the first portion has a reflectance less than a reflectance of the second portion, and reflectance of the reflection member gradually increases from the first portion thereof toward the second portion thereof.

2. The backlight unit as claimed in claim 1, wherein along the length of the opposing side surface of the light guide plate, a thickness of the reflection member gradually increases from the first portion thereof toward the second portion thereof, the thickness taken in a direction from the opposing side surface of the light guide plate to the reflection member.

3. The backlight unit as claimed in claim 1, wherein the opposing side surface of the light guide plate or a light incident surface of the reflection member comprises a reflection layer thereon.

4. The backlight unit as claimed in claim 1, further comprising a reflective adhesive layer between the opposing side surface of the light guide plate and a light incident surface of the reflection member,
    wherein the reflective adhesive layer comprises a transparent adhesive material and a reflective material which is dispersed in the transparent adhesive material.

5. The backlight unit as claimed in claim 1, wherein the light guide plate further comprises:
    an upper surface through which guided light exits the light guide plate toward the display panel, and
    a lens pattern at the upper surface of the light guide plate.

6. The backlight unit as claimed in claim 3, wherein the reflection layer comprises at least one selected from silver (Ag), aluminum (Al), nickel (Ni), gold (Au), ruthenium (Ru), rhodium (Rh), palladium (Pd), osmium (Os), iridium (Ir), platinum (Pt) and alloys thereof.

7. The backlight unit as claimed in claim 3, wherein along the length of the opposing side surface of the light guide plate, an area of the opposing side surface of the light guide plate or the light incident surface of the reflection member respectively corresponding to the reflection layer gradually increases from the first portion of the reflection member toward the second portion thereof.

8. The backlight unit as claimed in claim 4, wherein along the length of the opposing side surface of the light guide plate, a density of the reflective material of the reflective adhesive layer between the opposing side surface of the light guide plate and the light incident surface of the reflection member gradually increases from the first portion of the reflecting member toward the second portion thereof.

9. The backlight unit as claimed in claim 5, wherein the lens pattern at the upper surface of the light guide plate comprises a dome-shaped lens pattern extending from the light incident side surface of the light guide plate toward the opposing side surface of the light guide plate.

10. A display device comprising:
a display panel which displays an image with light;
a light source which generates the light;
a light guide plate which receives the light from the light source and guides the light to the display panel,
the light guide plate comprising a light incident side surface to which the light from the light source is incident, and an opposing side surface which opposes said light incident side surface; and
a reflection member disposed facing the opposing side surface of the light guide plate,
wherein along a length of the opposing side surface of the light guide plate, the reflection member facing the opposing side surface comprises: a first portion at a central portion of the opposing side surface of the light guide plate; and a second portion at an end portion of the opposing side surface of the light guide plate,
wherein the first portion has a reflectance less than a reflectance of the second portion, and a reflectance of the reflection member gradually increases from the first portion thereof toward the second portion thereof.

11. The display device as claimed in claim 10, wherein along the length of the opposing side surface of the light guide plate, a thickness of the reflection member gradually increases from the first portion thereof toward the second portion thereof, the thickness taken in a direction from the opposing side surface of the light guide plate to the reflection member.

12. The display device as claimed in claim 10, wherein
the reflection member facing the opposing side surface of the light guide comprises a discrete reflection layer provided in plurality on a light incident surface of the reflection member, the plurality of reflection layers being arranged spaced apart from each other along the length of the opposing side surface of the light guide plate, and
an area of the light incident surface of the reflection member respectively corresponding to the reflection layers gradually increases from the first portion of the reflection member toward the second portion thereof.

13. The display device as claimed in claim 10, wherein
the light guide plate further comprises an upper surface through which the guided light exits the light guide plate toward the display panel and a lower surface opposite to the upper surface,
further comprising a reflection sheet which is separate from the reflection member, the reflection sheet disposed between the lower surface of the light guide plate and the lower frame.

14. The display device as claimed in claim 10, wherein the light guide plate further comprises:
an upper surface through which the guided light exits the light guide plate toward the display panel, and
at the upper surface, a dome-shaped lens pattern provided in plurality arranged along the length of the opposing side surface of the light guide plate, each dome-shaped lens pattern extending from the light incident side surface of the light guide plate to the opposing side surface of the light guide plate.

* * * * *